United States Patent [19]

Peterson

[11] Patent Number: 5,017,310
[45] Date of Patent: May 21, 1991

[54] INTERCONNECTING LIQUID CONTACT PLATE SUPPORT SYSTEM FOR COOLING TOWERS

[76] Inventor: Charles A. Peterson, 2201 Lord Ashley Dr., Sanford, N.C. 27330

[21] Appl. No.: 551,561

[22] Filed: Jul. 11, 1990

[51] Int. Cl.⁵ .............................................. B01F 3/04
[52] U.S. Cl. .......................... 261/111; 261/DIG. 72
[58] Field of Search ..................... 261/111, DIG. 72; 292/DIG. 38, 80, 87

[56] References Cited

U.S. PATENT DOCUMENTS

| | | | |
|---|---|---|---|
| 3,751,017 | 8/1973 | Lemmens | 261/111 |
| 4,178,333 | 12/1979 | Shepherd | 261/111 |
| 4,396,559 | 8/1983 | Nutter | 261/112.1 |
| 4,451,411 | 5/1984 | Leferre | 261/111 |
| 4,728,468 | 3/1988 | Duke | 261/111 |
| 4,868,956 | 9/1989 | Shepherd | 261/111 |
| 4,871,329 | 10/1989 | Van Der Meer | 292/80 |
| 4,881,764 | 11/1989 | Takahashi et al. | 292/DIG. 38 |

*Primary Examiner*—Tim Miles
*Attorney, Agent, or Firm*—Olive & Olive

[57] ABSTRACT

A liquid cooling tower construction incorporates a tower fill assembly with liquid contact plates. The liquid contact plates interconnect in abutting relation utilizing slidable clamp members which engage locking ribs on the abutting sides of adjoining liquid contact plates. Thus, in each tier level, the liquid contact plates making up that tier level are effectively locked together but in a manner which enables the individual liquid contact plates to be detachably separated and removed whenever necessary.

6 Claims, 2 Drawing Sheets

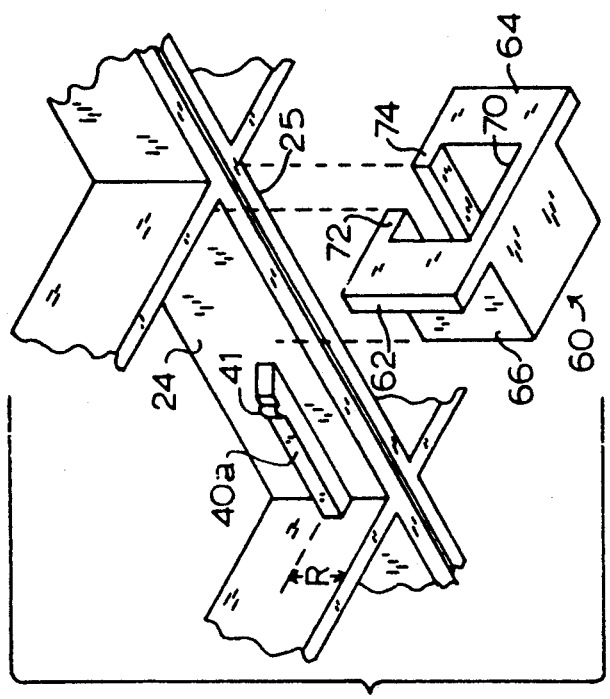
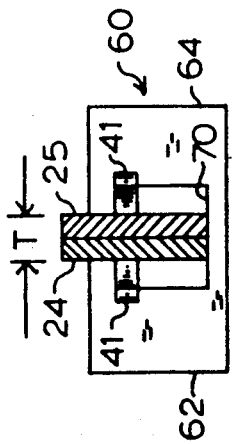
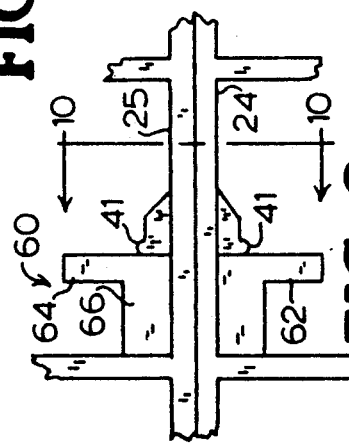
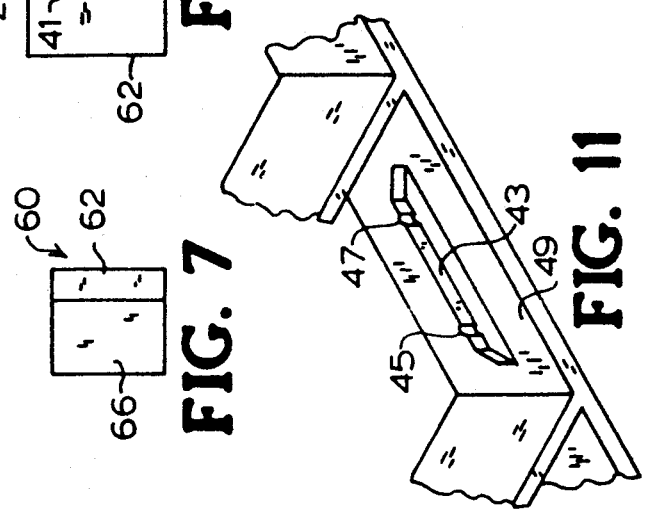

INTERCONNECTING LIQUID CONTACT PLATE SUPPORT SYSTEM FOR COOLING TOWERS

CROSS REFERENCE TO RELATED APPLICATION

The present application relates to and describes an improvement over the subject matter of copending U.S. Pat. application Ser. No. 07/467,959, filed Jan. 22, 1990 entitled "COOLING TOWER LIQUID CONTACT PLATE SUPPORT SYSTEM". cl BACKGROUND OF INVENTION 1. Field of Invention The subject matter of the present invention relates to liquid cooling towers of the type in which the liquid to be cooled flows downwardly within the tower through a series of vertically spaced grid or lattice-like structures referred to here as liquid contact plates and more specifically relates to an improved liquid contact plate support system for such cooling towers.

2. Background Art

In the general mode of operation of a cooling tower, a fan in the top of the cooling tower is actuated and draws air in through an opening at the base of the tower and upwardly through the tower to be exhausted to the atmosphere. Water at a relatively high temperature is fed into the top of the tower in a convenient manner. The water falls under the action of gravity through what is referred to as the tower fill assembly and is collected at the bottom of the tower. The descending water is contacted by the upwardly flowing atmosphere air which cools the water and enables the water to be reintroduced into an air conditioning system or other process using the water at a lower temperature than that at which the water entered the cooling tower. The present invention is primarily directed to the construction of the liquid contact plates which make up the cooling tower fill assembly and more specifically to a construction which enables the liquid contact plates to be interconnected and supported as an integral assembly at each tier level within the cooling tower.

In one type of support system, the liquid contact plates are joined to each other by a type of bracket such as shown in U.S. Pat. No. 3,751,017. A plurality of liquid contact plates are operatively connected together by the brackets at the different elevations and are effectively stacked one liquid contact layer above the other in a tier-like arrangement. A plurality of laterally spaced flexible strands are supported from the top of the tower and passed through the various tiers of liquid contact plates. Suitable clamps are secured below the liquid contact plates to support the tier of contact plates above. The use of brackets to join the liquid contact plates together at each tier level has not proven satisfactory for many reasons among which has been the need for a very large quantity of brackets and the lack of providing a secure attachment for holding the various liquid contact plates in a particular tier level together.

While fluid contact plates have been interconnected in vertical arrays as in U.S. Pat. No. 4,728,468, so far as applicant is aware, it had not been previously known, prior to applicant's copending application Ser. No. 07/467,959, to form liquid contact plates so as to eliminate the need for the corner brackets while permitting the sides of the liquid contact plates to be abutted and interconnected one with the other to form relatively rigid tiers of liquid contact plates one above the other. Providing a still further improved connecting means for liquid contact plates which permits the sides of one liquid contact plate to be detachably but firmly connected to the sides of surrounding liquid contact plates becomes the principle object of the present invention. Other objects will become apparent as the description proceeds.

SUMMARY OF INVENTION

A liquid contact plate according to the invention is molded of a suitable plastic as an integral piece. The inner surface of each side of the liquid contact plate is molded with a set of inwardly protruding supports. When the sides of a pair of liquid contact plates are abutted, a slideable clamp is fitted over the abutted sides and over each of a pair of inner locking ribs in opposed positions on the respective sides. The supports are formed so that the somewhat flexible clamp snaps into a releasably locked position. Thus, in each tier level, the liquid contact plates making up that tier level are effectively supported by each other and are locked together but in a manner which enables the individual liquid contact plates to be detachably separated and removed whenever necessary.

BRIEF DESCRIPTION OF DRAWINGS

FIG. 2 is a section view taken along line 2—2 of FIG. 1.

FIG. 7 is a side view of the clamp member, the opposite side being a mirror image of the side shown.

FIG. 8 is a partial perspective view of two abutting sides of two liquid contact plates made according to the invention and illustrating the clamp member ready to be received.

FIG. 9 is a fragmentary top view of the sides of the two liquid contact plates seen in FIG. 8 joined together and with the clamp member in its detachably locked position.

FIG. 10 is a section view taken in the direction of line 10—10 of FIG. 9.

FIG. 11 is a partial perspective view illustrating an alternative locking rib construction.

DESCRIPTION OF PREFERRED EMBODIMENT

As will be apparent from the description to follow, the present invention is primarily directed to the construction of the individual liquid contact plates such that a plurality of individual liquid contact plates made according to the present invention can be interconnected together to form an integral layer of liquid cooling elements as part of a tier as one of a stack of liquid cooling elements in a cooling tower. Reference may be made to my prior copending application Ser. No. 07/467,959 for background information the contents of which are deemed incorporated herein by reference and over which the present application represents an improvement.

For background, it again may be noted that in the general operation of a cooling tower, a fan draws air in through openings at the base of a tower housing. The air passes upwardly through the tower and exits through a nozzle to the atmosphere. Water at a relatively high temperature is fed into the top of the tower by a suitable distributor and falls under the action of gravity through the cooling tower fill assembly made up of the individual liquid contact plates. Each tier of liquid contact plates is supported by a plurality of flexible vertical strands which pass through suitably formed grooves in the liquid contact plates. The upwardly flowing air cools the water and the water collects in a basin at the base of the tower where it becomes available for being reintroduced into the air conditioning system or other liquid using process at a lower temperature than that at which the water entered the cooling tower. With the foregoing as background, it is to be noted that the present invention is primarily directed to providing an improved means for interconnecting the liquid contact plates in each tier of the tower.

Referring next to FIGS. 1-10 for a description of the present invention, each liquid contact plate 20 made according to the invention is molded as an integral unit and preferably is of a square shape, about two feet by two feet in size and approximately one and one-half pounds in weight. Each individual liquid contact plate 20 may have a thickness of approximately one to two inches depending on the application. Molded side bars 24, 26, 28 and 30 support a lattice-like liquid cooling, planar, perforate grid made up of molded intersecting strips 32, 34. Grooves 31 accommodate any necessary support stands. Some of the intersecting strips 32, 34 are relatively thick and others are relatively thin as generally illustrated in FIG. 2. Other forms of lattice-like grids and other dimensions may however be substituted for that described. It is to be understood that all of the liquid contact plates in each tier level are interconnected according to the invention in a manner to be described. Thus, at each tier level the liquid contact plates present a substantially integral cooling assembly.

Figure 1:
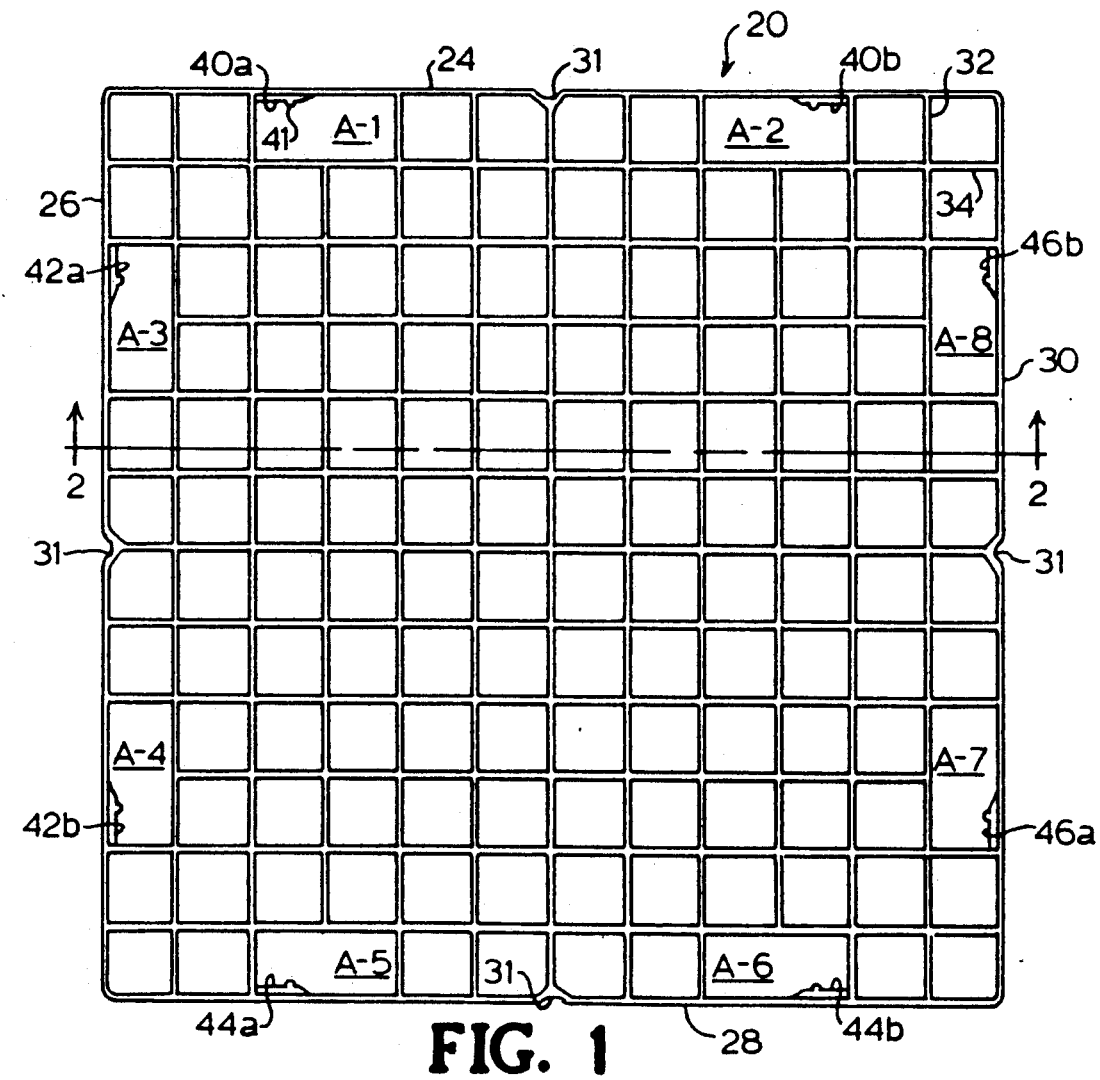
FIG. 1 is a top plan view of a liquid contact plate according to the present invention.
Figure 3:
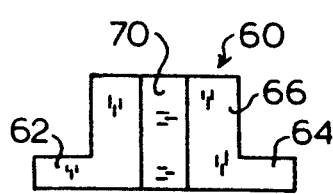
FIG. 3 is top view of the slideable clamp member employed to hold abutting sides of a pair of the liquid contact plates together.
Figure 5:
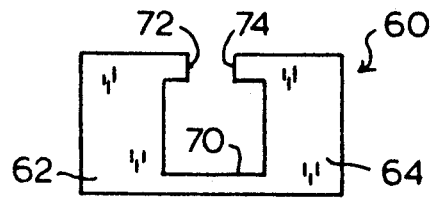
FIG. 5 is a rear end view of the clamp member.
Figure 4:
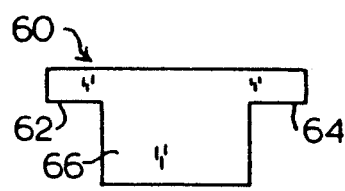
FIG. 4 is bottom view of the clamp member.
Figure 6:
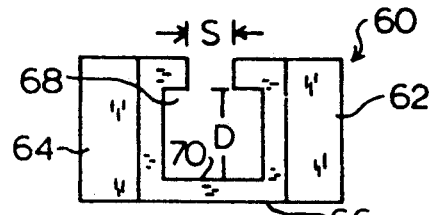
FIG. 6 is a front end view of the clamp member.

Making reference to FIG. 1, the representative liquid contact plate 20 according to the invention utilizes the molded side bars 24, 26, 28 and 30 of rectangular cross section to support the molded intersecting strips 32, 34 and to thereby form a planar perforate surface for cooling the liquid which drips through the various tiers of the tower. Side bars 24, 26, 28 and 30 are each molded with a pair of inwardly protruding locking ribs respectively designated as locking ribs 40a, 40b on the inner side surface of side bar 24, locking ribs 42a, 42b on the inner side surface of side bar 26, locking ribs 44a, 44b on the inner surface of side bar 28 and locking ribs 46a, 46b on the inner surface of side bar 30. Using locking ribs 40a as an example it will also be noted that the locking rib 40a has a protrusion 41 for releasably locking the clamp member 60 as later described. Each of the locking ribs are similarly formed and each such protrusion of locking tab 41 serves as both a locking tab and a stop as will be understood from later description. Also to be noted is that the clamping position areas A-1, A-2, A-3, A-4, A-5, A-6, A-7 and A-8 are left free of the intersecting ribs 32, 34 for the purpose of receiving the respective clamping members 60 when other liquid contact plates are to be joined to the liquid contact plate 20 shown in FIG. 1. An alternative locking rib 43 having locking tabs 45, 47 at each end and located on the representative side bar 49 more centrally of the respective clamping position area is shown in FIG. 11. In this embodiment, the clamping member 60 would be held between the tabs 45, 47 rather than between a rib 32 and a protrusion 41 as in FIG. 9.

The description next refers to the construction of the clamp members 60 each of which is employed as best seen in FIGS. 8-10 to engage the pair of locking ribs on the abutted side bars of a pair of liquid contact plates being releasably interconnected together. Referring more specifically to the construction of the clamp member 60, each such clamp member is molded as an integral solid piece and includes a pair of flanges 62, 64 enabling the clamp member 60 to be easily grasped for positioning. A body portion 66 forms an open channel 68 having a bottom wall 70 opposite a pair of inwardly protruding flanges 72, 74. Flanges 72, 74 are spaced apart by the width S (FIG. 6) substantially equal to the thickness T (FIG. 10) of a pair of abutted side bars of two adjacent liquid contact panels as best illustrated in FIG. 8. The depth D substantially mates the distance R (FIG. 8) which is the distance the upper surface of the locking rib e.g. locking rib 40 depicted in FIG. 8 is above the lower edge surface of the side bar 24 on which it is mounted. Because of the resiliency inherent in the plastic molded clamp member 60, flanges 72, 74 can be slightly spread apart when the clamp member is being installed as in FIG. 8. It will be understood in reference to FIG. 8 that clamp member 60 is first installed so that flanges 72, 74 are slightly above but clear of the pair of locking ribs on the respective abutted side bars, e.g. side bar 24 and side bar 25, with only one such locking rib 40a being shown by way of example in FIG. 8. Then, clamp member 60 is slid inwardly until flanges 72, 74 clear the respective locking tabs 41 and is then moved slightly inwardly to a locked position restrained by the locking tabs 41 and by the rib walls as further illustrated in FIG. 9. In the embodiment of FIG. 11, the clamping member 60 would of course rest in a more central position relative to the clamping area.

In summary, it can be seen that the liquid contact plate construction of the present invention enables each liquid contact plate in each layer or tier of liquid contact plates to be quickly interconnected to all other surrounding liquid contact plates by utilizing the described clamping members. An entire tier can thus be quickly assembled once the required number of preformed liquid contact plates and clamping members are available at the construction site. Each layer or tier thus effectively becomes an integral filtering element but with the ability to quickly disassemble either a portion or all of such layer or tier by slightly spreading the flanges of each clamping member apart and then sliding it free of the locking ribs on which it is mounted and then removing it.

I claim:
1. A fill assembly for a cooling tower, comprising:
  (a) a liquid contact plate which is one of a plurality of similarly constructed liquid contact plates forming a series of vertically spaced horizontal tiers within a liquid cooling tower, said liquid contact plate being formed as an integral molded piece and comprising:
    (i) side bars forming a rectangular frame and having inner and outer side surfaces;
    (ii) a plurality of intersecting ribs extending between and integrally joined to said side bars inner surfaces and forming a perforate planar structure for cooling a liquid passed therethrough; and

(iii) a pair of spaced apart inwardly protruding locking ribs appended to and protruding inwardly from each said side bar inner surface and shaped for receiving a clamping member for joining the side bars of two similarly constructed liquid contact plates in abutting relation; and (b) means for releasably engaging said locking ribs to clamp one side bar of said liquid contact plate to another side bar of another similarly constructed liquid contact plate in abutting relation.

2. A fill assembly as claimed in claim 1 wherein said means for releasably engaging said locking ribs comprises an integrally formed clamping member having a body portion with a bottom wall and above the bottom wall an open ended central channel passing therethrough and above and extending for the length of said channel a centrally positioned slot formed between a pair of opposed flanges extending inwardly and overlying said channel, said clamping member being dimensioned for receiving in said channel by passing through said slot opposed portions of a pair of abutting side bars of two liquid contact plates to be joined and for grasping below said flanges the respective locking ribs on the side bars being joined to maintain the corresponding liquid contact plates in abutting relation.

3. A fill assembly as claimed in claim 2 wherein said clamping member is formed of a material permitting at least a slight degree of resilient movement in said flanges.

4. A fill assembly as claimed in claim 3 wherein each of said locking ribs is so formed and located that said clamping member is able to assume a defined clamping position in which it is restrained from movement dependent upon its flanges not being forced apart to avoid such restraint.

5. A fill assembly as claimed in claim 4 wherein each of said locking ribs is formed with a protruding locking tab engaged by said clamping member when in said defined clamping position.

6. A fill assembly as claimed in claim 4 wherein each of said locking ribs is formed with a pair of protruding locking tabs between which said clamping member is positioned when in said defined clamping position.

* * * * *